United States Patent Office 3,140,522
Patented July 14, 1964

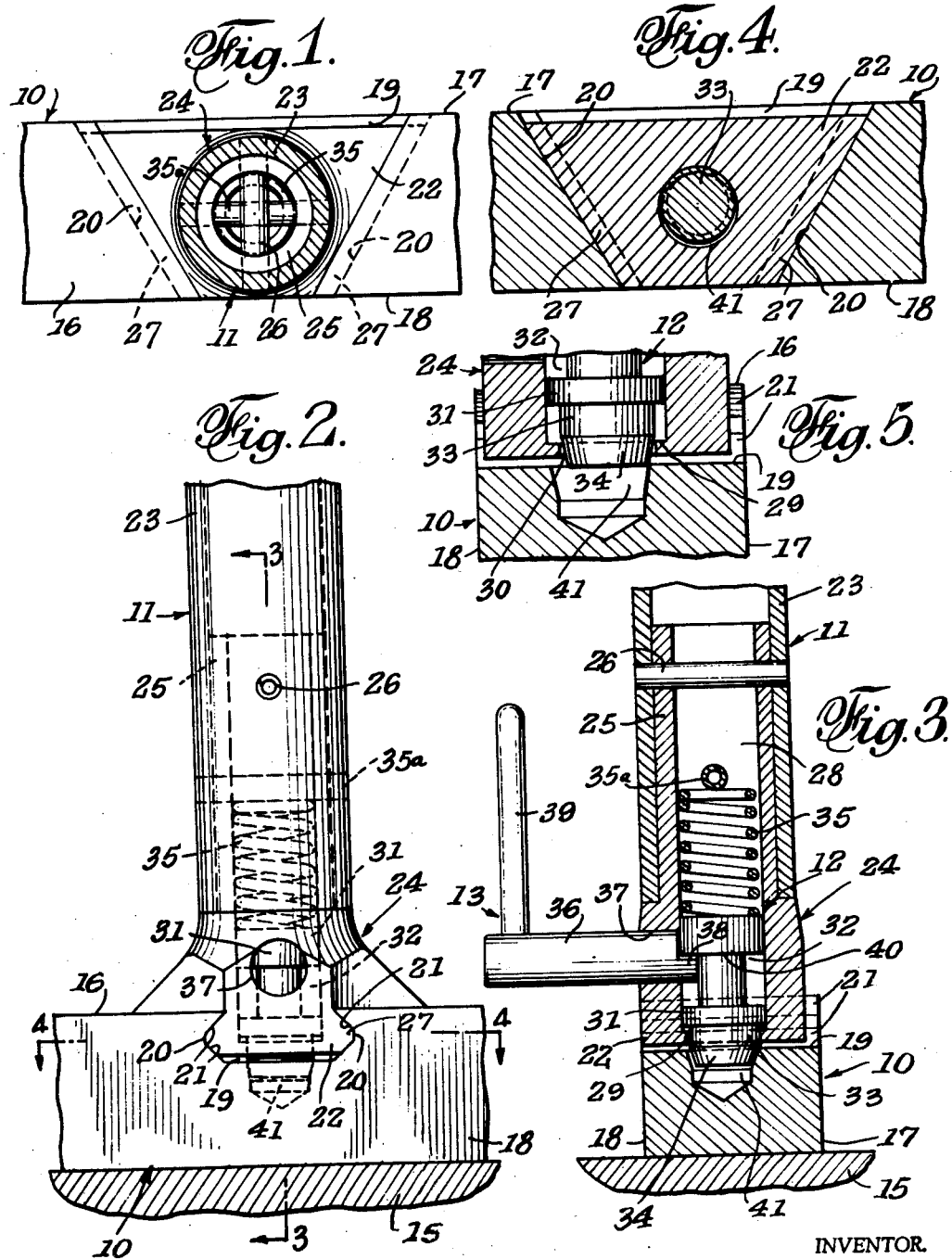

3,140,522
MECHANICAL CONNECTION
Elmer W. Prout, 1145 E. California Ave., Glendale 6, Calif., assignor of twenty percent to Max Fink, Beverly Hills, Calif., and forty-one percent to Edwin C. Elsner, Pasadena, Calif.
Filed Feb. 19, 1962, Ser. No. 174,178
5 Claims. (Cl. 24—223)

This invention relates to a mechanical connection and has for an object to provide a quickly engageable structure that is safe and secure, when in connected condition, and yet is releasable in a quick and expeditious manner.

The present invention is especially related to the connection of rigid structural members, as differentiating from bands, belts and straps, another object of the invention being to provide connection means for rigid members that provides for slight misalignment of the parts being connected and yet affords easy engagement of the parts to insure safety of the connection, whether of a temporary or more permanent nature.

While the invention has general use and application, the same is especially valuable in connection with the transportation of heavy, expensive and shock-sensitive equipment in vehicles on wheels or air-borne, the invention providing tightly joined connection means that insures the safety of such equipment against the usual shocks and forces ordinarily attending transport of heavy articles.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a cross-sectional plan view of a mechanical connection according to the present invention.

FIG. 2 is a side elevational view thereof.

FIG. 3 is a longitudinal sectional view as taken on the line 3—3 of FIG. 2.

FIG. 4 is a cross-sectional view as taken on the line 4—4 of FIG. 2.

FIG. 5 is an enlarged and fragmentary sectional view showing the connection partly engaged.

The connection that is illustrated comprises, generally, a member 10, a perpendicular member 11, means 12 carried by the member 11 to have releasable locking connection with the member 10, and a key 13 for retracting the means 12 both to effect separation of the members 10 and 11 and preparatory to connecting said members.

The member 10, of metal or other strong material, is preferably affixed to a base 15 or may be formed as a part of said base. In any case, the member 10 is elongated and is preferably provided with a surface 16 that extends transversely between side faces 17 and 18. A tapered or wedge-shaped seat 19 is formed in the member 10, said seat being defined between converging grooved guideways 20 that are shown as of opposed angular form so that the faces 21 thereof serve as wedging faces for centering the end of a member, for instance, the end 22 of the perpendicular member 11, in the seat 19. The angle between the guideways 20, as in FIGS. 1 and 4, centers the member 22 in a horizontal direction, and the angle between the respective pairs of faces 21, as in FIG. 2, centers the member 22 in a vertical or perpendicular direction.

The perpendicular member 11 is shown as a tube or pipe 23, and a foot 24 affixed to the end of said pipe and on which the mentioned end 22 is provided.

The pipe 23 is exemplary of any elongated and rigid member that may be either hingedly or pivotally mounted at one end, the end that is broken away, or provided with a foot at said broken end similar to the foot 24 that is shown. In any case, the member 11 is capable of being moved between connecting and disconnecting relation with the seat 19 of member 10 and particularly in a direction to engage or disengage with said seat, whether the movement is linear or arcuate.

The foot 24 is provided with a shank 25 that extends into the pipe 23, a clinch pin 26 or the like being used to fixedly connect said pipe and foot substantially as shown. Beyond said shank 25, the foot is provided with the mentioned end 22 which is formed with converging sides 27 that have a cross-sectional form complementary to the form of the guideways 20. FIG. 2 shows the interfit between the guideways 20 and the sides 27 and how the faces 21 of said slideways center the end 22 in the perpendicular direction above mentioned. It will be clear that the converging sides 27 of the foot 24 center on the guideways, as mentioned. Therefore, the connection obtained is without looseness or play of any sort.

The means 12 is provided to lock the member 11 to the member 10 when the foot 24 is engaged in the seat 19, as above described, said means being housed in a longitudinal bore 28 in the foot 24, an annular shoulder 29 being provided at the lower end of said bore, the same defining a reduced bore 30.

The releasable locking means 12 is shown as a locking bolt 31 that slidingly fits in the bore 28 and has an annular groove 32 between the ends thereof. A reduced extension 33 on said bolt extends through the reduced bore 30 and is provided with a tapered end 34. A spring 35 between a cross pin 35a in the member 11 and the locking bolt 31, biases the latter in a directon to project the tapered end 34 of said bolt through said reduced bore 30. Normally, the annular shoulder 29 limits the projection movement of the bolt.

The key 13 has a shank 36 that may be introduced into a hole 37 in a side of the foot 24 so that the half-round end projection 38 of said shank may enter the annular groove 32 in the locking bolt. Upon turning of said shank 36 by means of the handle 39, the flat on the half-round projection 38 will engage the shoulder 40 formed by said annular groove 32 and retract the bolt against the bias of spring 35, as shown in FIG. 5.

The above-described bolt 31 cooperates with a keeper hole 41 formed in the member 10 in medial alignment with the bolt of a connecting member 11 but, as indicated in FIG. 3, preferably slightly offset forwardly toward the converging end of the seat 19 with respect to the axis of the bolt, when the foot 24 is firmly fitted into said seat. In this case, the hole 41 is somewhat larger than the bolt end 33, 34 and is flared according to the taper 34 of the bolt end. This offset relationship of bolt and hole insures cam-wedging engagement of the bolt end 34 with the side of the hole toward the diverging part of seat 19. As a consequence, the foot end 22 is forced toward the converging part of the seat, resulting in a firm locking together of the members 10 and 11. FIG. 5 shows the bolt 31 as the same is about to project into the hole 41. FIG. 3 shows the fully locked position.

It will be noted that the angle between the guideways 20 is quite acute. Thus, the connection may be made or separated with but little sliding movement of the foot 24 in seat 19 because the small side of the foot is entirely clear of the guideways when moved a distance but a quarter of the width of member 10.

The guideways and the complementary interfitting parts may be reversed within the scope of the invention.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A mechanical connection comprising:
   (a) a first member provided with a seat having converging grooved guideways,
   (b) a second member provided with complementary converging end portions engaged with said grooved guideways,
   (c) the second member being perpendicular to the first member and the members being held against separation in a direction perpendicular to the seat in the first member by said engagement of its end portions in the grooved guideways of the first member,
   (d) a bolt in the second member having a locking end directed toward and through the end of said member between the converging portions thereof,
   (e) said first member, between the guideways thereof, having a hole located to receive said bolt end when the guideways and complementary portions are engaged,
   (f) the hole being larger than the bolt and the axes of the hole and bolt being offset when the grooved guideways and complementary end portions are engaged, and
   (g) the bolt end being tapered and the hole having a flare to provide a cam-wedging engagement of the bolt in the flare of the hole in a direction toward the convergence of said guideways to effect firm and rigid engagement of the complementary end portions of the second member in the converging grooved guideways of the first member, and
   (h) a spring to impose a constant bias on the bolt on the end thereof opposite its tapered end to press said tapered end into cam-wedging engagement with the flare of the hole.

2. A mechanical connection comprising:
   (a) a first member provided with a seat having converging grooved guideways,
   (b) a second member provided with complementary converging end portions engaged with said grooved guideways,
   (c) the second member being perpendicular to the first member and the members being held against separation in a direction perpendicular to the seat in the first member by said engagement of its end portions in the grooved guideways of the first member,
   (d) a bolt in the second member having a locking end directed toward and through the end of said member between the converging portions thereof,
   (e) said first member, between the guideways thereof, having a hole located to receive said bolt end when the guideways and complementary portions are engaged,
   (f) a spring within the second member to bias the bolt to wedging engagement in said hole to effect firm and rigid engagement of the converging end portions of the second member in the converging grooved guideways in the first member,
   (g) said bolt having a shoulder directed toward its locking end, and
   (h) a rotational key adapted to be introduced through the second member and to engage said shoulder to retract the bolt against the bias of the spring and thereby release the locking engagement of the members.

3. A mechanical connection according to claim 2 in which:
   (a) the second member, above the converging portions thereof, has a laterally directed opening, and
   (b) the key is provided with a shank having rotational bearing in said opening, and said shank has an offset projection to engage the bolt shoulder.

4. A mechanical connection comprising:
   (a) a first member provided with a seat having converging grooved guideways,
   (b) a second member provided with complementary converging end portions engaged with said grooved guideways to hold the members against separation in a direction perpendicular to the seat in the first member,
   (c) a bolt in the second member having an inwardly tapered locking end directed toward and through the end of said member between the converging portions thereof,
   (d) said first member, between the guideways thereof, having a hole including an open end formed by an outwardly tapered camming surface, said hole being located so as to receive said bolt end when the guideways and complementary portions are engaged,
   (e) a spring within the second member to bias the bolt to wedging engagement in said hole to effect firm and rigid engagement of the converging end portions of the second member in the converging grooved guideways in the first member.
   (f) said bolt having a shoulder directed toward its locking end, and
   (g) a key having an operating lever arm and a shaft end adapted to be introduced in an opening in said second member, said shaft end including a camming surface adapted to engage a complementary camming surface on said bolt to retract said bolt against the bias of the spring when said lever arm is rotated to thereby release the locking engagement of the members.

5. A mechanical connection according to claim 4 in which:
   (a) said hole in said first member is misaligned with respect to the axis of said bolt in a direction toward the convergence of said guideways.

References Cited in the file of this patent

UNITED STATES PATENTS

| | | |
|---|---|---|
| 324,671 | Drake | Aug. 18, 1885 |
| 386,896 | Rodel | July 31, 1888 |
| 614,177 | McBride | Nov. 15, 1898 |
| 1,078,559 | Seabrook | Nov. 11, 1913 |
| 2,702,732 | McCarran | Feb. 22, 1955 |
| 2,712,151 | Becht | July 5, 1955 |

FOREIGN PATENTS

| | | |
|---|---|---|
| 879,053 | Great Britain | Oct. 4, 1961 |